US010672280B1

(12) United States Patent
Barber

(10) Patent No.: US 10,672,280 B1
(45) Date of Patent: Jun. 2, 2020

(54) BIMODAL USER INTERFACE SYSTEM, DEVICE, AND METHOD FOR STREAMLINING A USER'S INTERFACE WITH AN AIRCRAFT DISPLAY UNIT

(75) Inventor: Sarah Barber, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 986 days.

(21) Appl. No.: 13/248,814

(22) Filed: Sep. 29, 2011

(51) Int. Cl.
*G06F 3/048* (2013.01)
*G08G 5/00* (2006.01)

(52) U.S. Cl.
CPC ......... *G08G 5/0034* (2013.01); *G08G 5/0039* (2013.01)

(58) Field of Classification Search
CPC ...... G06Q 50/30; G08G 5/0021; G08G 5/003; G08G 5/065; G08G 5/0034; G08G 5/0039; G10L 15/26; B64D 43/00; G06F 3/167; G01C 21/3611; G01C 21/3608; B60K 2350/906
USPC .......................... 715/702, 251, 825; 248/702
See application file for complete search history.

(56) References Cited

U.S. PATENT DOCUMENTS 8,645,825 B1 * 2/2014 Cornea et al. ................ 715/257
9,032,319 B1 * 5/2015 Hammack ............ G06F 3/0486 715/769
2005/0171664 A1 * 8/2005 Konig ..................... G10L 15/22 701/36
2005/0222721 A1 * 10/2005 Chen ...................... G01C 23/00 701/14
2006/0247925 A1 * 11/2006 Haenel .................... G10L 15/22 704/215
2007/0124507 A1 * 5/2007 Gurram ................ G06F 3/0481 710/1
2008/0177465 A1 * 7/2008 Barber et al. ................. 701/206
2009/0182562 A1 * 7/2009 Caire ................ G01C 21/3608 704/275
2009/0228281 A1 * 9/2009 Singleton et al. ............ 704/275
2010/0161160 A1 * 6/2010 Wilson ................ G01C 23/005 701/15
2012/0022778 A1 * 1/2012 Mishra ......................... 701/206

* cited by examiner

*Primary Examiner* — Alex Olshannikov
(74) *Attorney, Agent, or Firm* — Daniel M. Barbieri; Donna P. Suchy; Angel N. Gerdzhikov

(57) ABSTRACT

Present novel and non-trivial system, device, and method for streamlining a user's interface with an aircraft display unit. The system is comprised of a tactile interface device, a voice recognition device, a display unit, and a bimodal interface processor ("BIP"). Both the tactile interface device and the voice recognition device are configured to provide tactile and voice input data to the BIP, and the display unit is configured with at least one page comprised of user-selectable widget(s) and user-enterable widget(s). The BIP is configured to receive the tactile input data corresponding to selections of each user-selectable widget and each user-enterable widget unless the latter has been inhibited by an activation of the user-enterable widget. The BIP is further configured to receive voice input data corresponding to each user-enterable widget unless the user-enterable widget has not been activated. The activation of each user-enterable widget is controlled through tactile input data.

15 Claims, 13 Drawing Sheets

REPLACEMENT SHEET

BIMODAL USER INTERFACE SYSTEM, DEVICE, AND METHOD FOR STREAMLINING A USER'S INTERFACE WITH AN AIRCRAFT DISPLAY UNIT

BACKGROUND OF THE INVENTION

Field of the Invention

This invention pertains generally to the field of aircraft display units that present flight information to the pilot or flight crew of an aircraft.

Description of the Related Art

In today's flight decks, data entry (including graphical flight planning) is accomplished through the use of tactile input devices such as knobs, buttons, and cursor-controlled devices (e.g., trackballs, track pads, joysticks, etc. . . . ). Attempts have been made to transition some of these functions to a voice-based interface using voice recognition technology. Results have shown, however, that data entry via voice can actually take longer, and be more prone to error.

Several factors contribute to the longer times of voice data entry and errors resulting from voice data entry. First, there is a need to tell the system when to start listening. Second, feedback required to inform the pilot that the system has recognized the correct function requiring input. Third, large vocabularies contribute to an increase in the number of errors associated with voice recognition technology.

BRIEF SUMMARY OF THE INVENTION

The embodiments disclosed herein present novel and non-trivial bimodal user interface system, device, and method for streamlining a user's interface with an aircraft display unit. The streamlining of the user's interfaces may be accomplished by limiting or restricting the mode of data entry of voice input data of a user-enterable widget by using tactile input data of a user-selectable widget as a means to control the entry of data. This allows for a "point and speak" or "tap and talk" user interface.

In one embodiment, the bimodal user interface system is disclosed. The may be comprised of a tactile interface device, a voice recognition device, a display unit, and a bimodal interface processor ("BIP"). Both the tactile interface device and the voice recognition device may be configured to provide tactile and voice input data to the BIP, and the display unit may be configured with one main menu and at least one page comprised of user-selectable widget(s) and user-enterable widget(s); the tactile interface device could be a touch screen of the display unit. The BIP may be programmed or configured to receive tactile input data corresponding to a selection of the main menu, to receive the tactile input data corresponding to a selection of each user-selectable widget, and to receive the tactile input data corresponding to a selection of each user-enterable widget unless the latter input data has been inhibited by an activation of the user-enterable widget; the inhibition may be overridden by selecting a user-selectable widget. The BIP may be further configured to receive voice input data corresponding to each user-enterable widget unless the user-enterable widget has not been activated. The activation of each user-enterable widget is controlled through tactile input data.

In another embodiment, the bimodal user interface device is disclosed. The device could be the BIP programmed or configured as discussed above.

In another embodiment, the bimodal user interface method is disclosed. The method could be comprised of receiving tactile input data corresponding to a selection of the main menu, receiving tactile input data corresponding to a selection of each user-selectable widget, and receiving the tactile input data corresponding to a selection of each user-enterable widget unless the latter input data has been inhibited by an activation of the user-enterable widget. The method could be further comprised of receiving voice input data corresponding to each user-enterable widget unless the user-enterable widget has not been activated. The activation of each user-enterable widget is controlled through tactile input data.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
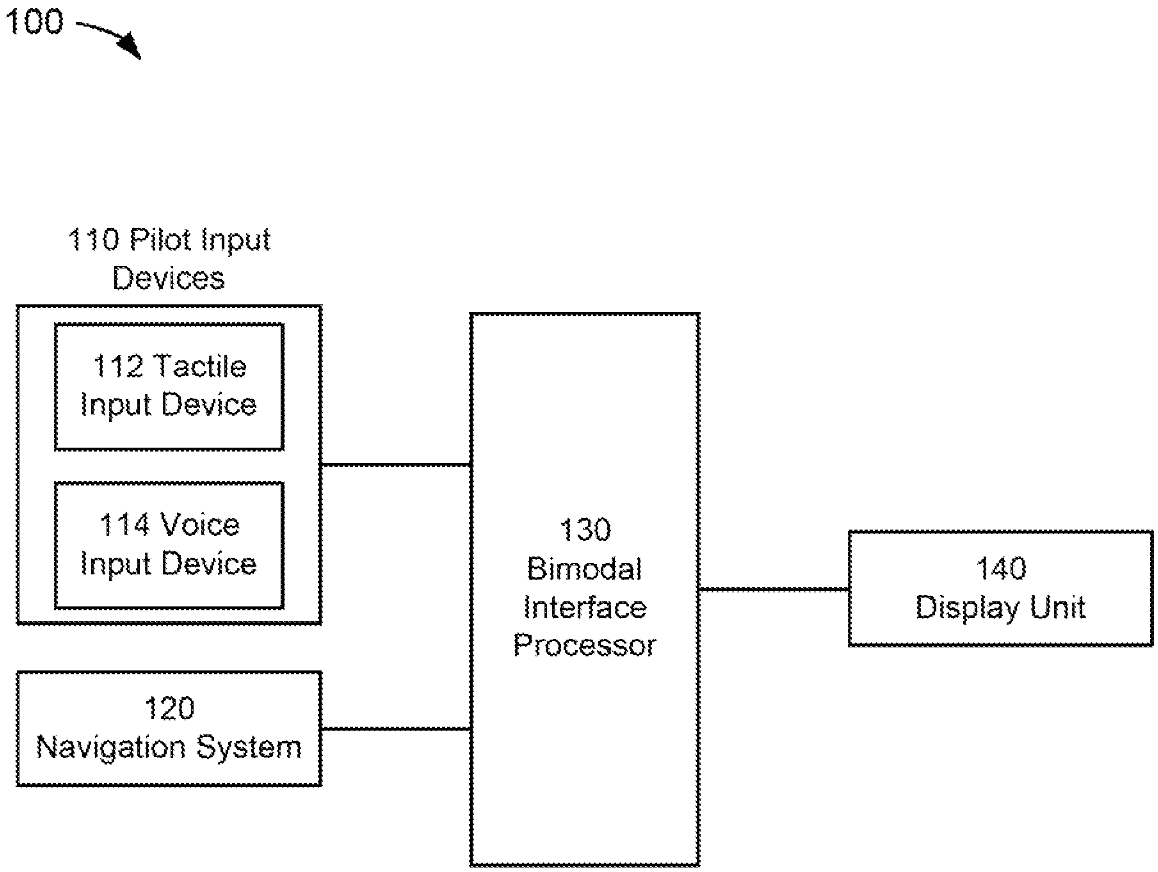
FIG. 1 depicts a block diagram of a bimodal user interface system.

FIG. 1 depicts a block diagram of a bimodal user interface system 100. The system 100 of an embodiment of FIG. 1 may be comprised of a pilot input devices 110, a navigation system 120, a bimodal interface processor ("BIP") 130, and a display unit 140.

In an embodiment of FIG. 1, the pilot input devices 110 could be comprised of any source for facilitating a pilot's interaction with graphical user interfaces ("GUI") referred to as widgets that are displayed on the surface of the display unit 140. The pilot input device 110 may include any tactile input device 112 that allows for the manual selection of widgets and/or entry of data. Such devices could include, but are not limited to, a tactile input device (e.g., keyboard, control display unit, cursor control device, touch screen device, etc. . . . ). The display unit 140 could be included as a pilot input device 110 if it is able to receive pilot input (e.g., touch screen display). The pilot input device 110 may include any voice input device 114 that allows for a voice selection of widget and/or entry of data through, for instance, a voice recognition system. The use of voice recognition systems are known to those skilled in the art. As embodied herein, the pilot input device 110 may provide input representative of a pilot's selection to the BIP 130. It should be noted that, although the discussion herein is drawn to the term "pilot," the definition of such term should not be limited to flight personnel but should include ground personnel and/or any viewer of the display unit 140.

In an embodiment of FIG. 1, the navigation system 120 comprises the system or systems that could provide navigation data information in an aircraft. It should be noted that data, as embodied herein for any source or system in an aircraft including a navigation system, could be comprised of any analog or digital signal, either discrete or continuous, which could contain information. As embodied herein, data and signals are treated synonymously. Aircraft could mean any vehicle which is able to fly through the air or atmosphere including, but not limited to, lighter than air vehicles and heavier than air vehicles, wherein the latter may include fixed-wing and rotary-wing vehicles.

The navigation system 120 may include, but is not limited to, an air/data system, an attitude heading reference system, an inertial guidance system (or inertial reference system), a global navigation satellite system ("GNSS") (or satellite navigation system), and/or a flight management computing system, all of which are known to those skilled in the art. For the purposes of the embodiments herein, a radio altimeter system may be included in the navigation system 120. As embodied herein, the navigation system 120 could be a source for providing navigation data including, but not limited to, aircraft location (e.g., latitude and longitude coordinates) and/or altitude.

The navigation system 120 could include a flight management system ("FMS") for performing a variety of functions performed to help the crew in the management of the flight; these functions are known to those skilled in the art. These functions could include receiving a flight plan and constructing both lateral and vertical flight plans from the flight plan. A pilot or flight crew may initialize the FMS including, but not limited to, the selection of a flight plan, where such flight plan could provide the basis for all computations and displays. The pilot could create a flight plan from waypoints stored in a navigation database or select a flight plan stored in a database of the FMS as discussed in detail below.

In an embodiment of FIG. 1, the BIP 130 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The BIP 130 may be driven by the execution of software or computer instruction code containing algorithms developed for the specific functions embodied herein. The BIP 130 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the processor could also consist of more than one electronic data processing unit. As embodied herein, the BIP 130 could be a processor(s) used by or in conjunction with any other system of the aircraft including, but not limited to, the pilot input devices 110, the navigation system 120, the display system 140, or any combination thereof.

The BIP 130 may be programmed or configured to receive as input data representative of information obtained from various systems and/or sources including, but not limited to, the pilot input devices 110 (which could include the display unit 140) and/or the navigation system 120. As embodied herein, the terms "programmed" and "configured" are synonymous. The BIP 130 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a wired data bus or through a wireless network. The BIP 130 may be programmed or configured to execute one or both of the methods discussed in detail below and provide output data to various systems and/or units including, but not limited to, the display unit 140.

In an embodiment of FIG. 1, the display unit 140 comprises any unit having a display surface on which widgets may be presented to the pilot on a display surface of the display unit 140. The display unit 140 could be, but is not limited to, a Primary Flight Director, Navigation Display, Head-Up Display, Head-Down Display, Multi-Purpose Control Display Unit, Engine Indicating and Crew Alerting System, Electronic Centralized Aircraft Monitor, Multi-Function Display, Side Displays, and Data Link Control Display Unit. As embodied herein, the display unit 140 may receive image data provided by the BIP 130 and/or provide input data is configured as a pilot input device 110.

The advantages and benefits of the embodiments discussed herein may be illustrated by showing how the novel techniques disclosed herein may be adopted for streamlining the entry of input data by restricting or limiting the mode of data input. The drawings of FIG. 2 provide exemplary depictions of two pages that could appear in the same window presented on the display unit 140. Although the discussion herein will be drawn to pages displayed in response to menu selections corresponding to fuel management and flight plan setup, the embodiments are not limited to the display unit 140 presenting these windows only. Although only two pages will be discussed, those skilled in the art understand that a manufacturer or end-user may configure the display unit 140 for the simultaneous presentation of multi-windows on the screen of the display unit 140. Thus, the embodiments disclosed herein are not limited to the examples that will be discussed but apply to the presentation of any page appearing in any window that may be presented on the screen of the display unit 140.

Figure 2A:
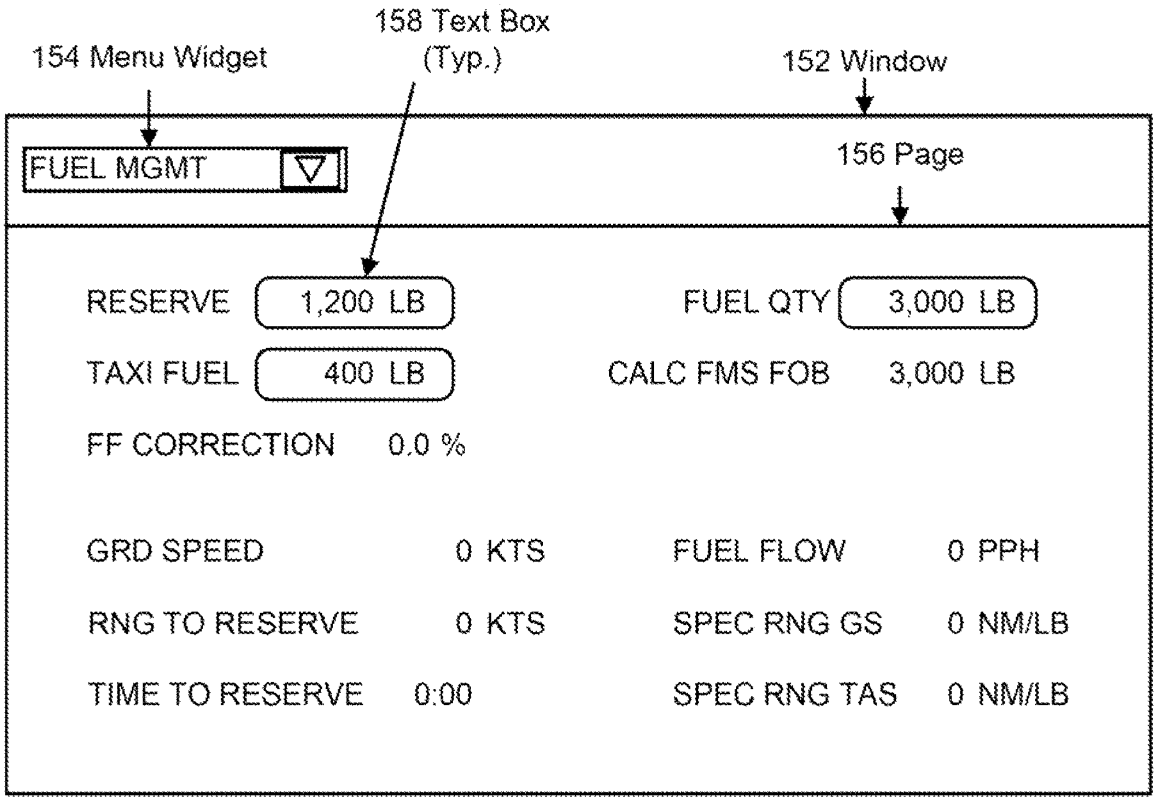
FIGS. 2A and 2B provide exemplary depictions of two pages that could appear in the same window presented on a display unit.

As shown in the drawings of FIG. 2, two pages are depicted, where each page has been programmed to present information representative of data generated by a flight management system FMS1. In an embodiment of FIG. 2A, a window 152 and a menu widget 154 are illustrated. Within the window 152, there is a page 156 comprised of a plurality of text box widgets 158. As indicated in FIG. 2A, the page 156 is a page corresponding to fuel management information provided by the FMS.

Figure 2B:
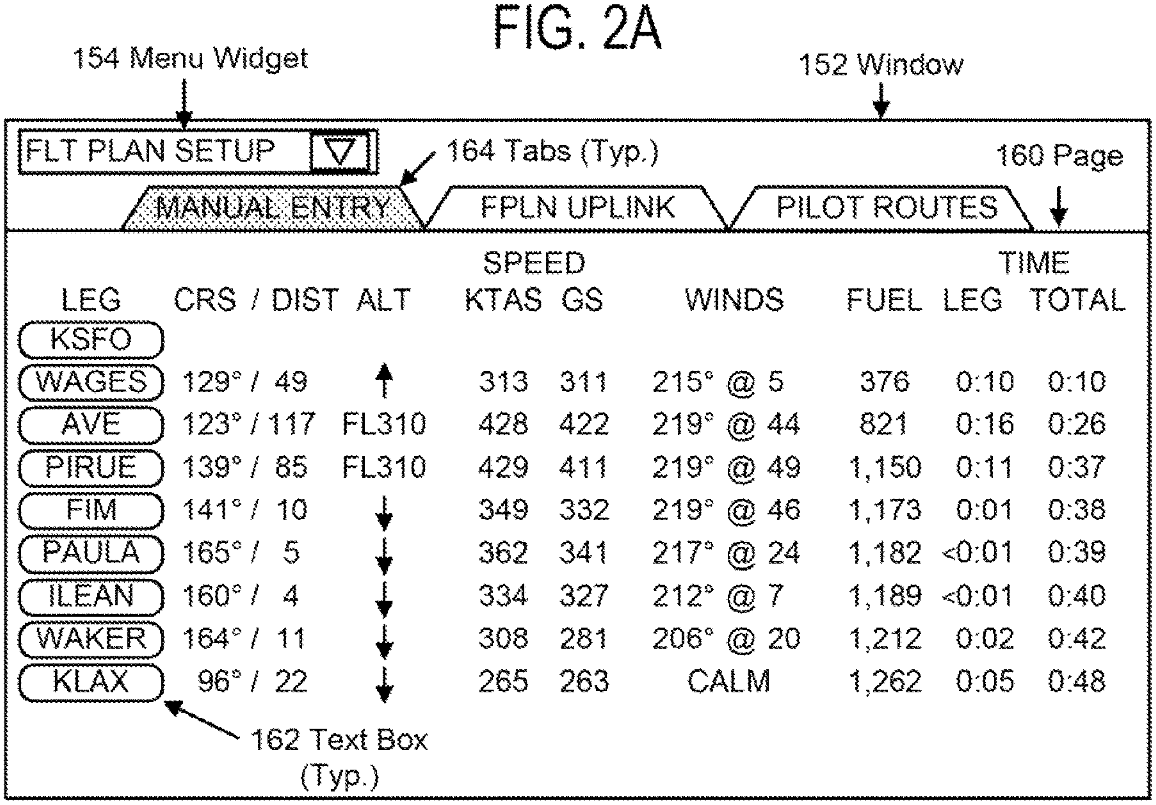

In an embodiment of FIG. 2B, the window 152 and the menu widget 154 are illustrated, but a different choice from the menu has been made. A page 160 comprised of a plurality of text box widgets 162 and tabs 164 is presented, where the page corresponds to flight pan setup information provided by the FMS, and the route presented on the page 160 is based upon an assumed flight between San Francisco International Airport (KSFO) and Los Angeles International Airport (KLAX).

The advantages and benefits of the embodiments disclosed herein may be illustrated by showing in the drawings of FIG. 3 an exemplary method in which bimodal user interfaces may be selectively and limitedly employed to streamline a user's interface with the display unit 140. In this example, the two modes of user interface will be comprised of the tactile mode and the voice mode; these two modes may be combined to form an efficient "point and speak" or "tap and talk" user interface.

As disclosed herein, only the tactile mode will be available to the pilot when interacting with text box widgets that have not been activated and, except for making revisions to a flight plan, when interacting with user-selectable widgets; once the pilot makes a tactile interaction an inactive text box widget, its tactile mode becomes unavailable and only the voice mode will be available to the pilot when entering characters in a text box widget because it has now been activated by the tactile interaction. By restrictively and selectively making one of a plurality of modes active, the user's interface will be streamlined. For the purpose of illustration and not of limitation, the tactile interface mode will be drawn to a pilot's tapping of a touch screen of the display unit 140.

Figure 3A:
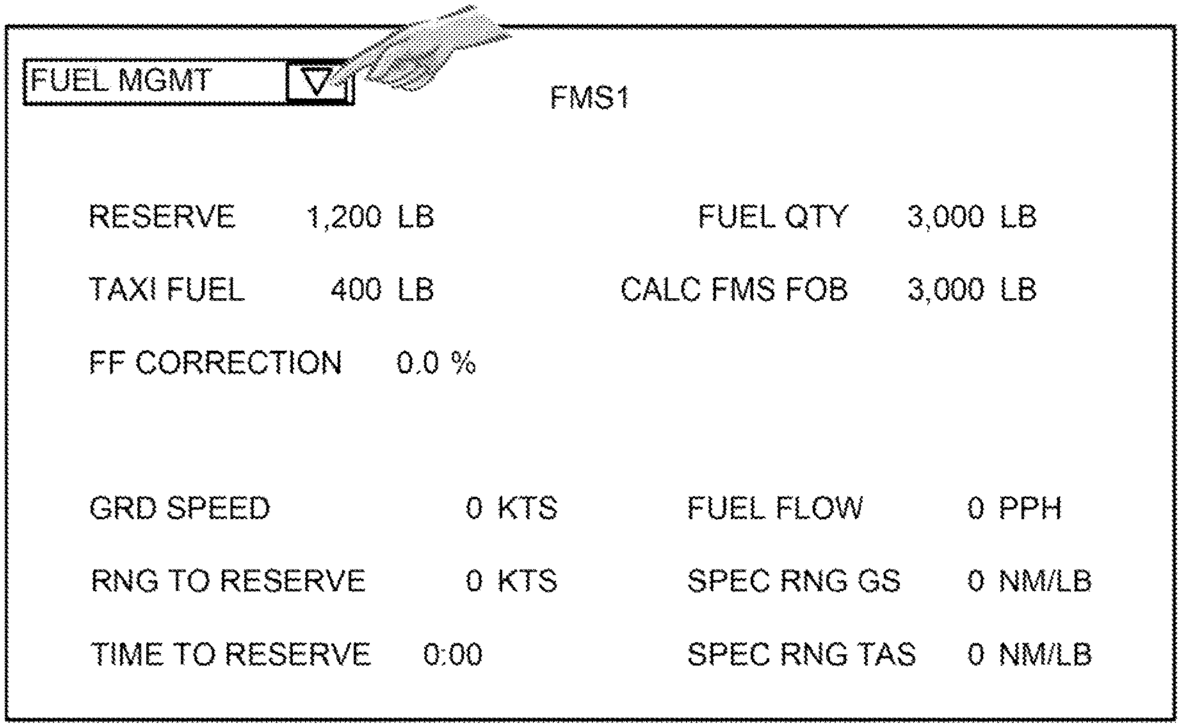
FIGS. 3A through 3C illustrate an example of how pages may be changed by the bimodal user interface method disclosed herein.

The fuel management page of FIG. 2A is shown in FIG. 3A. In this example, it is assumed that the pilot wishes to gain access to the flight plan setup so that he or she may enter the waypoints of the flight plan to reach the end result of FIG. 2B. Furthermore, it is assumed that none of the text boxes are currently active, and according to the disclosures herein, the voice mode would be currently inactive. Because the voice interface is inactive, only the tactile mode is available from which the pilot is able to gain access to the flight plan setup page.

Figure 3B:
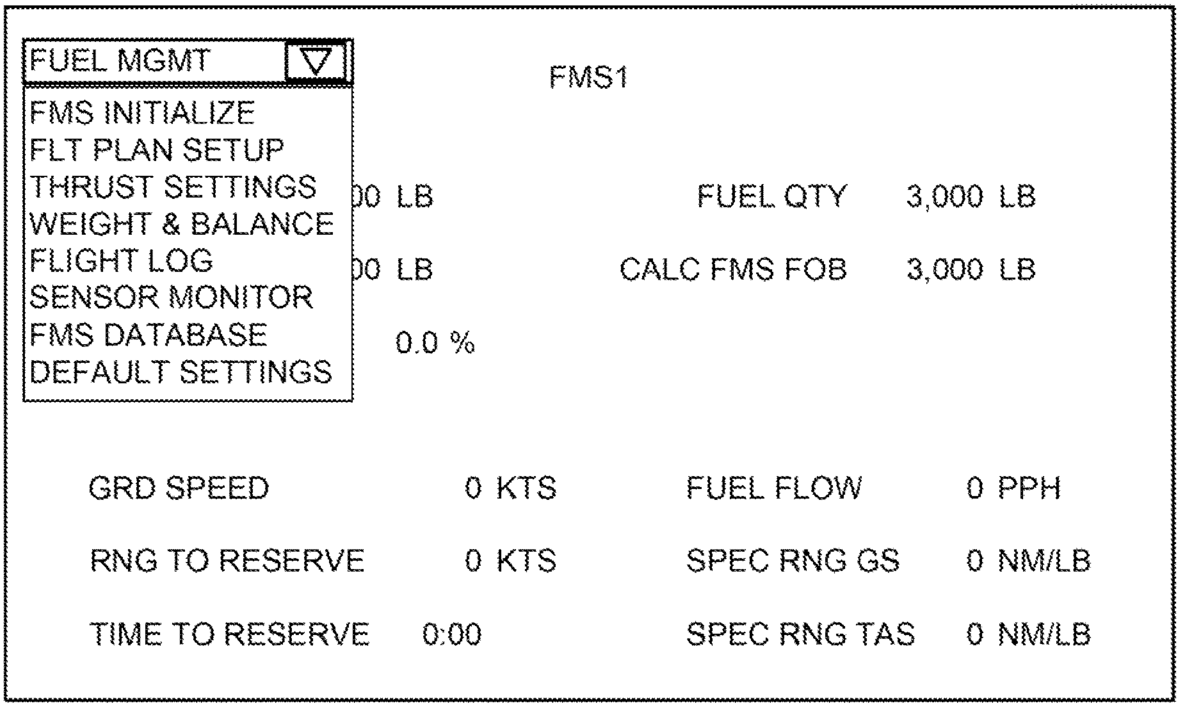
Figure 3C:
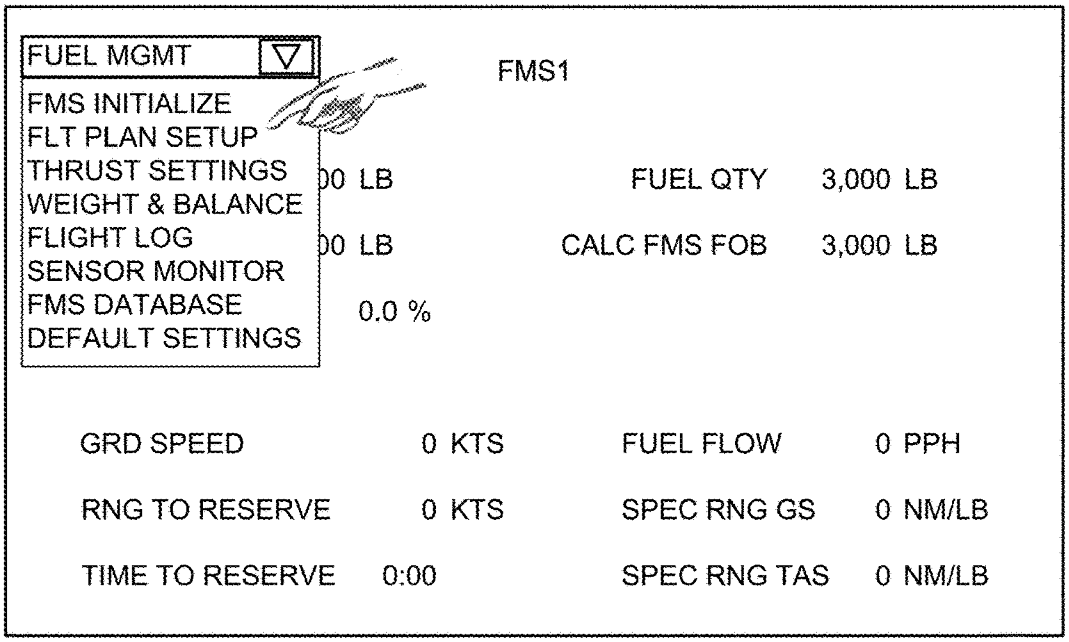
Figure 3D:
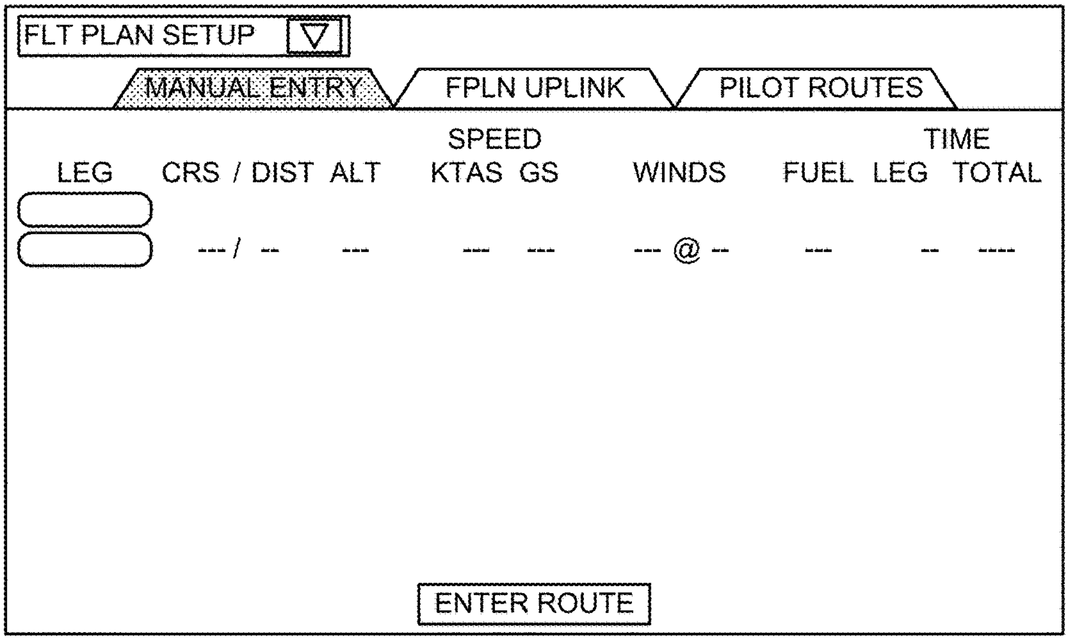
FIGS. 3D through 3J continue with the example of the bimodal user interface method by illustrating the entry of a first waypoint in a flight plan.

As shown in FIG. 3A, the pilot has tapped on the user-selectable menu widget displaying FUEL MGMT. For the purpose of illustration and brevity and not of limitation, the tactile mode will be drawn to a pilot's tapping of a touch screen of the display unit 140 even though other tactile modes such as a cursor-controlled device may be available. In response to the tapping, a user-selectable pull-down menu appears as shown in FIG. 3B. From the pull-down menu, the pilot may gain access to the flight plan setup page by tapping on FLT PLAN SETUP as in FIG. 3C. In response to the pilot's tap, a flight plan setup page appears as shown in FIG. 3D.

Figure 3E:
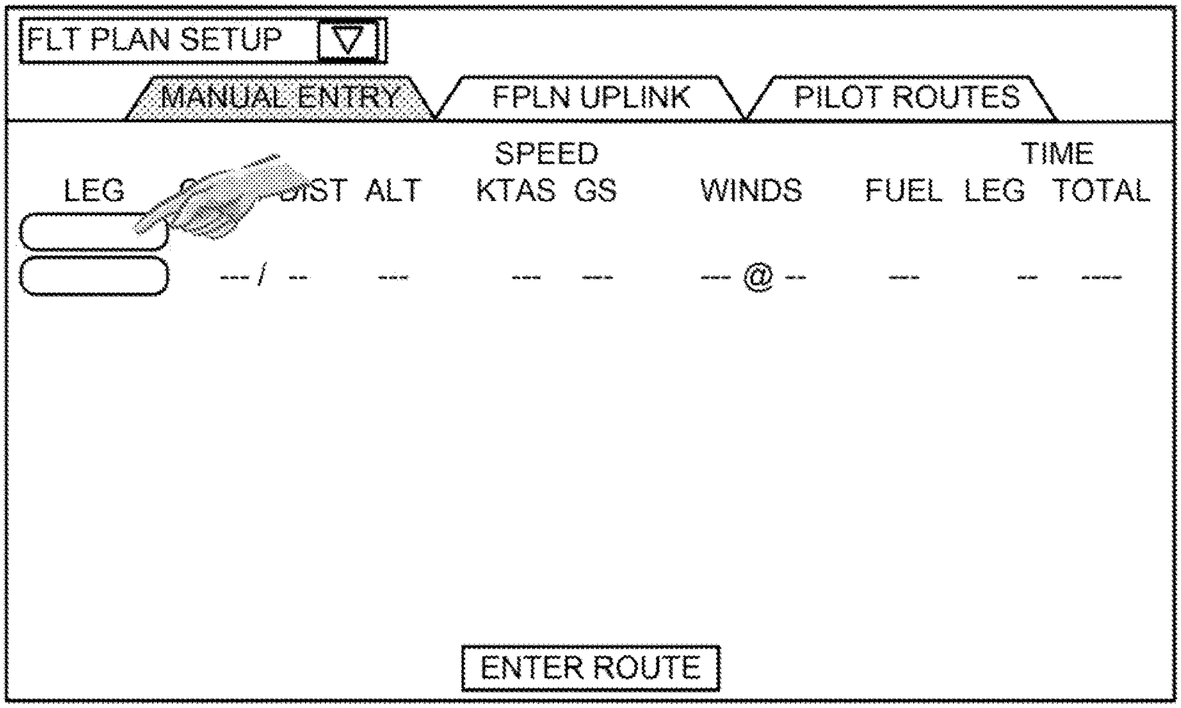
Figure 3F:
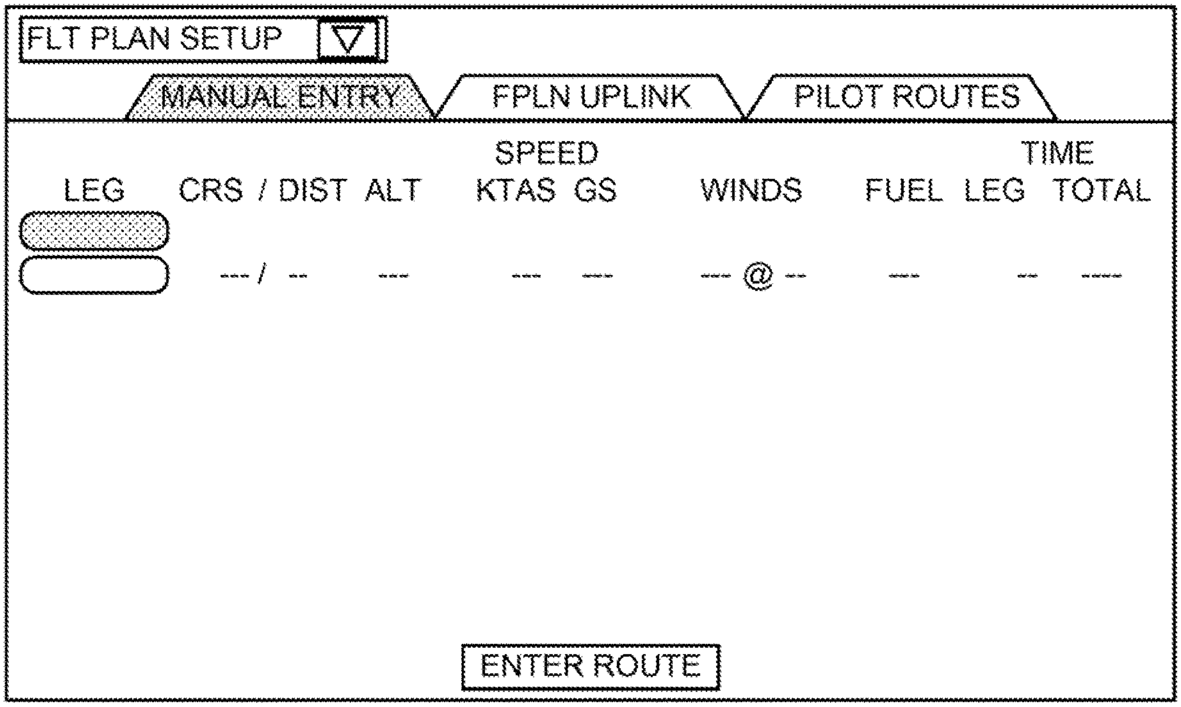

The pilot may now begin to enter the waypoints of the flight plan. As shown in FIG. 3E, the pilot has tapped on the text box to start the waypoint entering process. In response to the pilot's tap, the user-enterable text box has been activated as highlighted in FIG. 3F. When a user-enterable text box widget has been activated, the BIP 130 may be programmed to activate the voice mode and deactivate (or inhibit) the tactile mode for the text box (although other user-selectable widgets may remain active and/or the entire screen except for the screen location of the text box). Because a text box may contain a limited number of characters (e.g., 36 alpha-numeric characters) and a small number of commands (e.g., NEXT, ENTER, etc. . . . ), the number of files required from a library of the voice recognition system is minimized; moreover, the ability to enter characters through speech eliminates the need to make entries through the keyboard; although not indicated in the drawings of FIG. 3, a separate user-selectable widget could be placed within the window and/or page from which the deactivation or inhibition of the tactile mode may be overridden, thereby allowing the use of the keyboard.

Figure 3G:
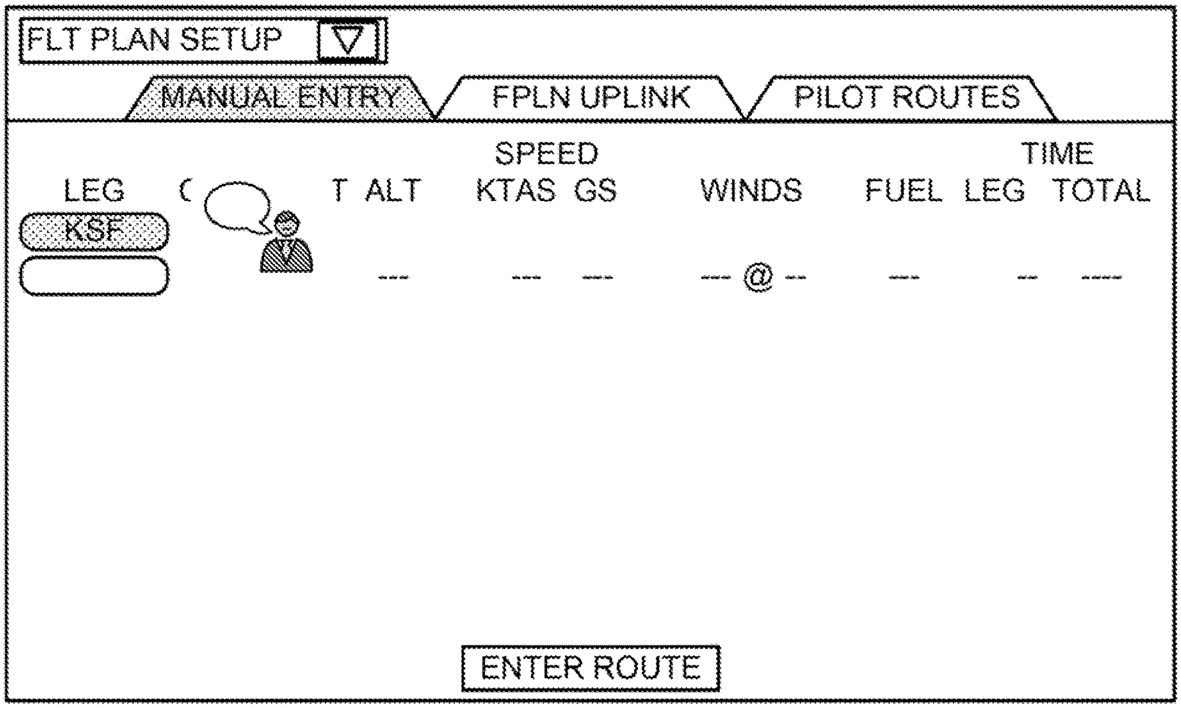
Figure 3H:
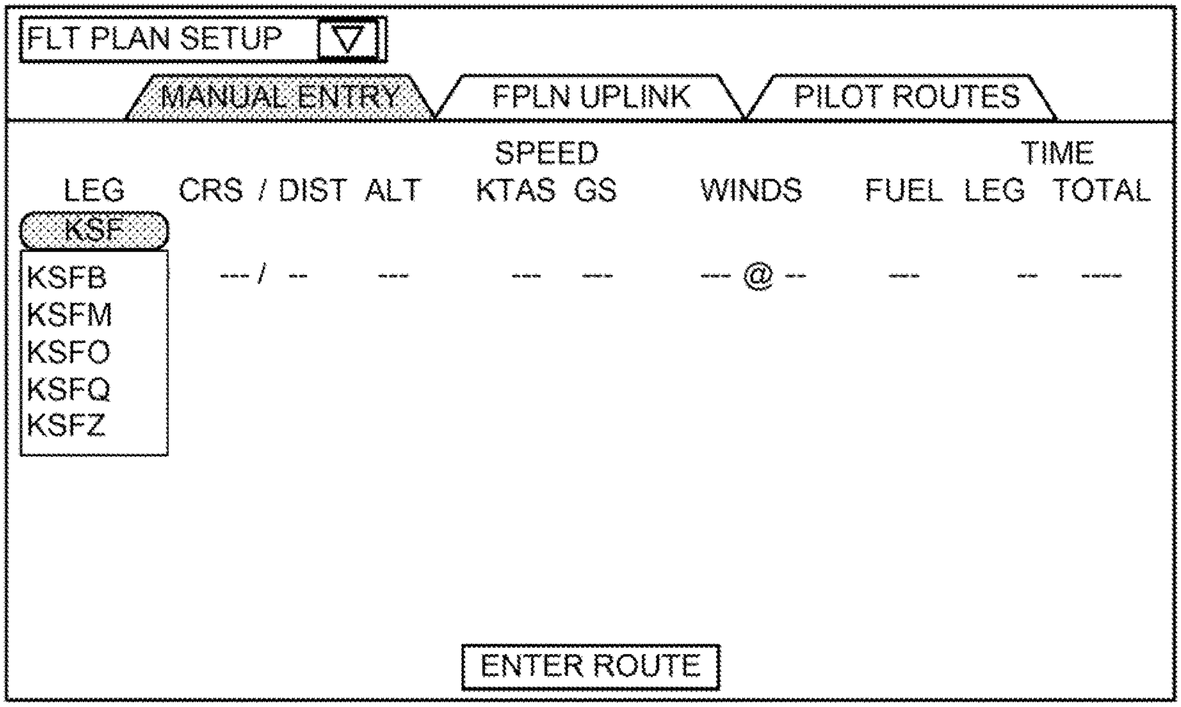

Referring to FIG. 3G, the pilot has begun to enter the first waypoint by speaking the words KILO SIERRA FOXTROT. As embodied herein, the BIP 130 could be programmed with an auto-complete feature so that the pilot has the opportunity to make an immediate selection if desired. This is indicated by the pop-up widget shown in FIG. 3H containing a plurality of auto-complete entries of waypoints beginning with the characters KSF. Because the pop-up widget is user-selectable widget, the inhibition of the tactile mode applicable to the text box may not apply to the pop-up widget.

To provide this feature, the BIP 130 may be programmed to retrieve waypoint records and other records such as, but not limited to, navaid records, airport records, etc . . . , stored in a database such as the database that is typically part of the FMS and known to those skilled in the art. As embodied herein, the retrieval of waypoint records could be limited to the aircraft's location. For example, if the BIP 130 has been programmed to receive data representative of aircraft location from the navigation system 120, the retrieval operation may be limited to known waypoints located within a relatively small range of the aircraft (e.g., 25 NM, 50 NM, etc. . . . ). Moreover, since this is the first entry in the flight plan, the processor could be programmed to determine the airport at which the aircraft is currently located using waypoint records retrieved from the navigation database and the aircraft location data received from the navigation system 120. After determining the airport, the BIP 130 could present this information after the pilot selects the first text box but before speaking his or her entry.

Figure 3I:
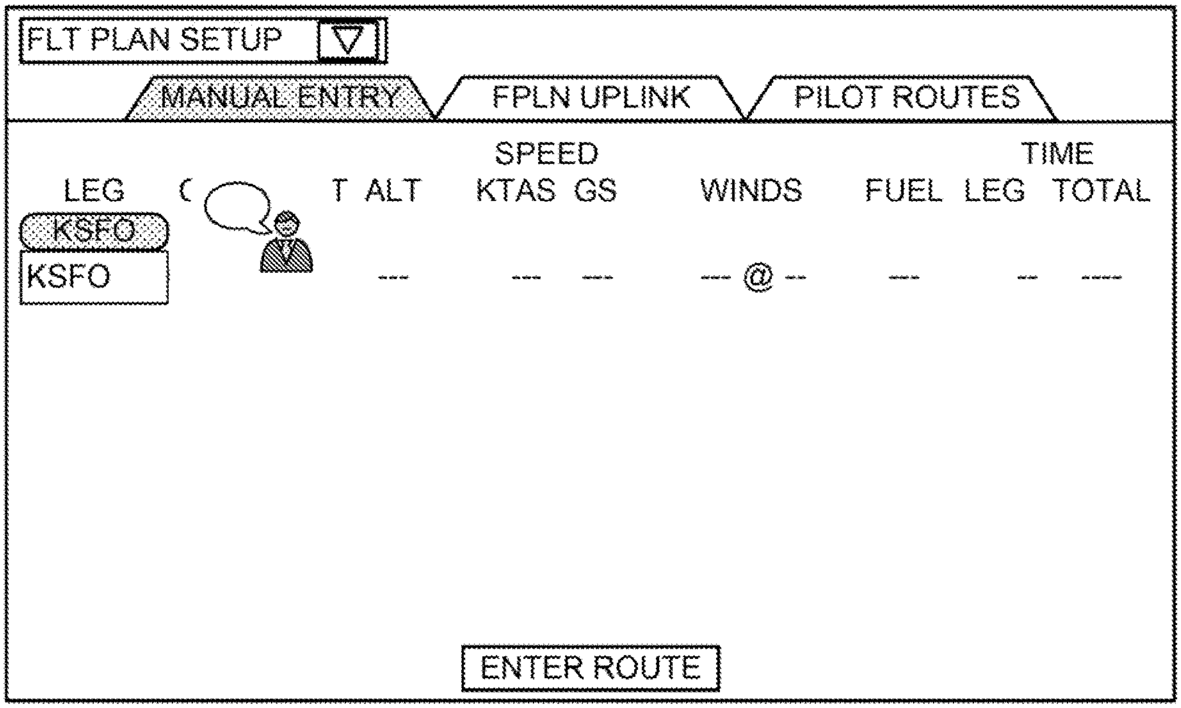
Figure 3J:
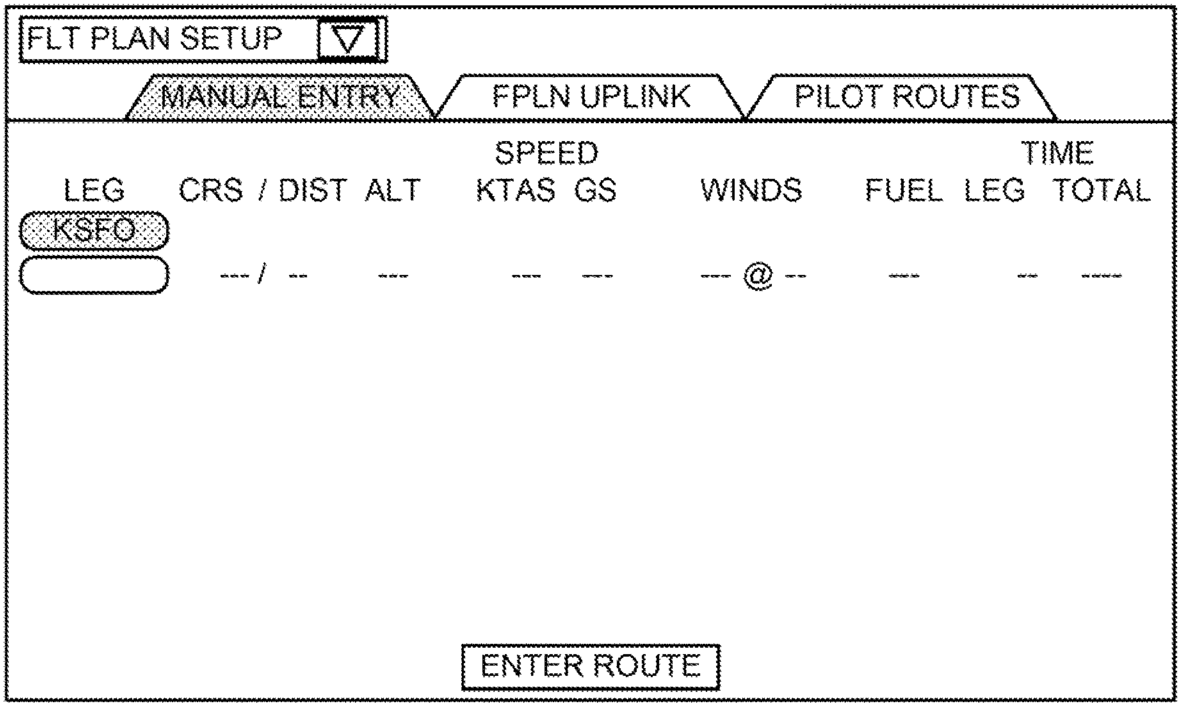

As shown in FIG. 3I, the pilot has elected to speak the last character OSCAR and not tap the one remaining auto-complete entry KSFO. Because the four letters KSFO fill the text box and the entry of the waypoint is complete, the pilot may speak a command such as ENTER to indicate to the BIP 130 that the entry is complete; if so, the BIP 130 could be programmed to deactivate the voice mode. In another embodiment in which successive entries may be expected such as entering of the flight plan, the command NEXT could be spoken to indicate to the BIP 130 to move to the next text box in succession; if so, the BIP 130 could be programmed to activate the voice mode of this next text box while deactivating the voice mode for the text box containing KSFO. In another embodiment, because the deactivation of the tactile mode could have been limited to the text box itself, the pilot could have completed the entry of KSFO by tapping on another user-selectable widget, or any part of the screen if the BIP 130 did not disable all screen locations except for the text box of the KSFO entry. In response to the pilot's voice entry of ENTER, the entry has been completed as highlighted in FIG. 3J.

Figure 3K:
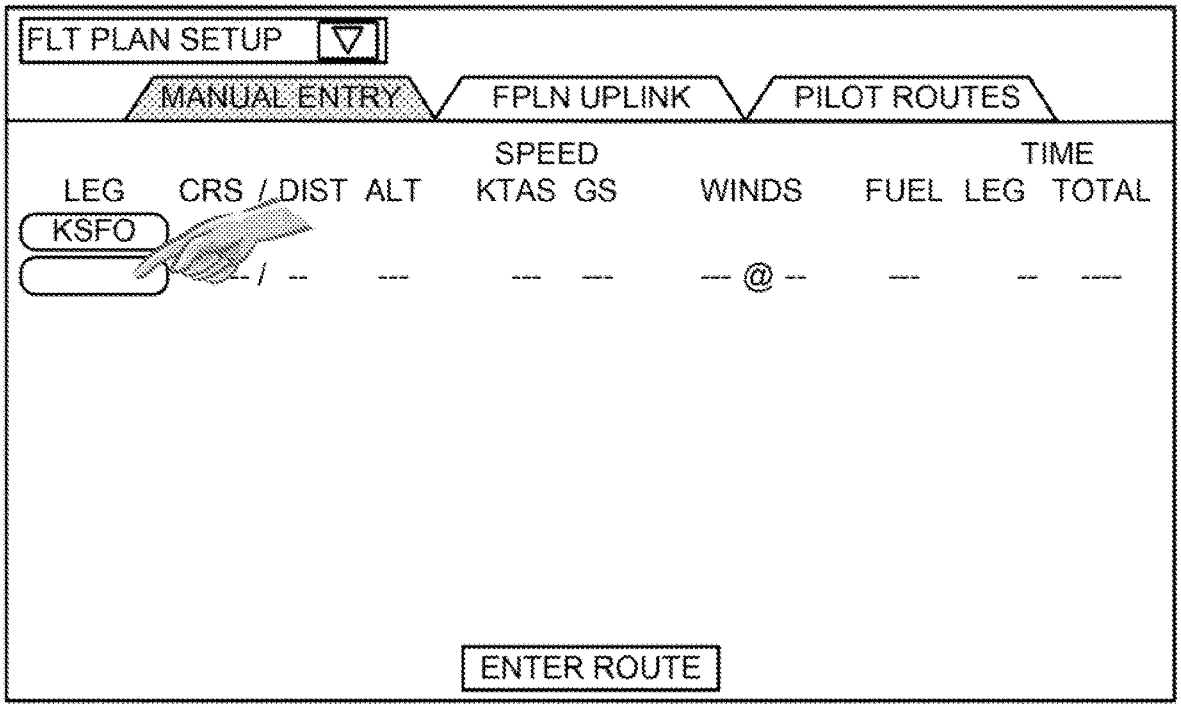
FIGS. 3K through 3S continue with the example of the bimodal user interface method by illustrating the entry of a second waypoint in the flight plan.
Figure 3L:
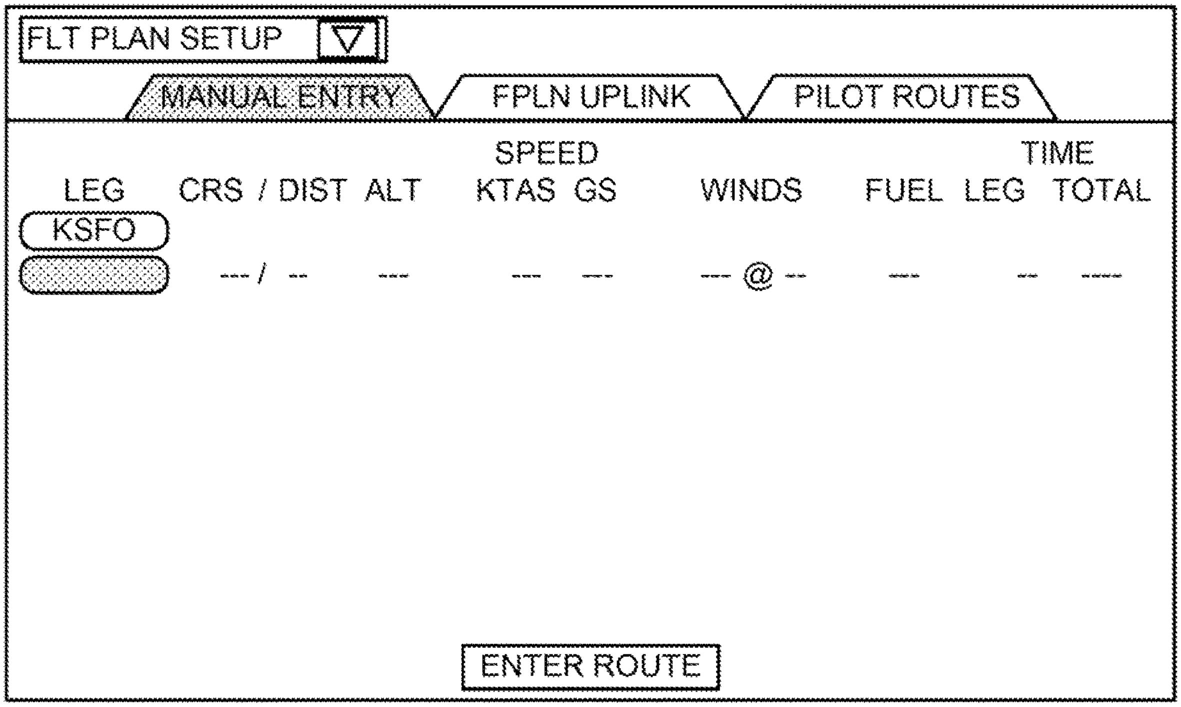
Figure 3M:
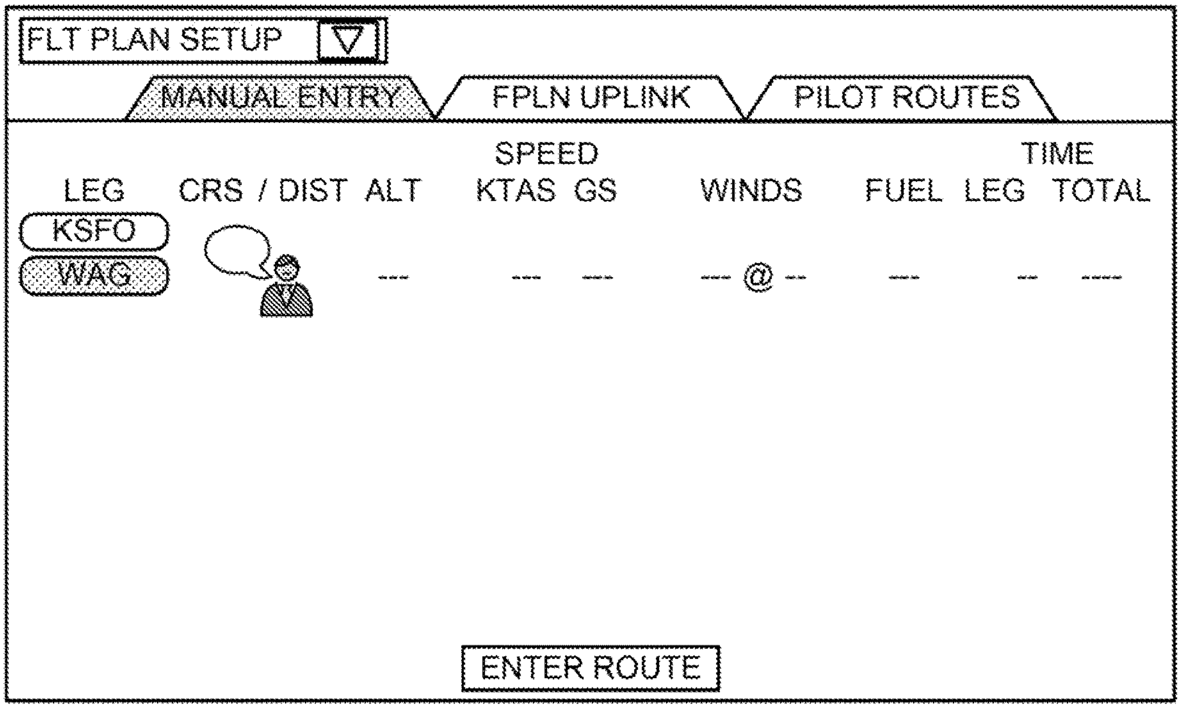
Figure 3N:
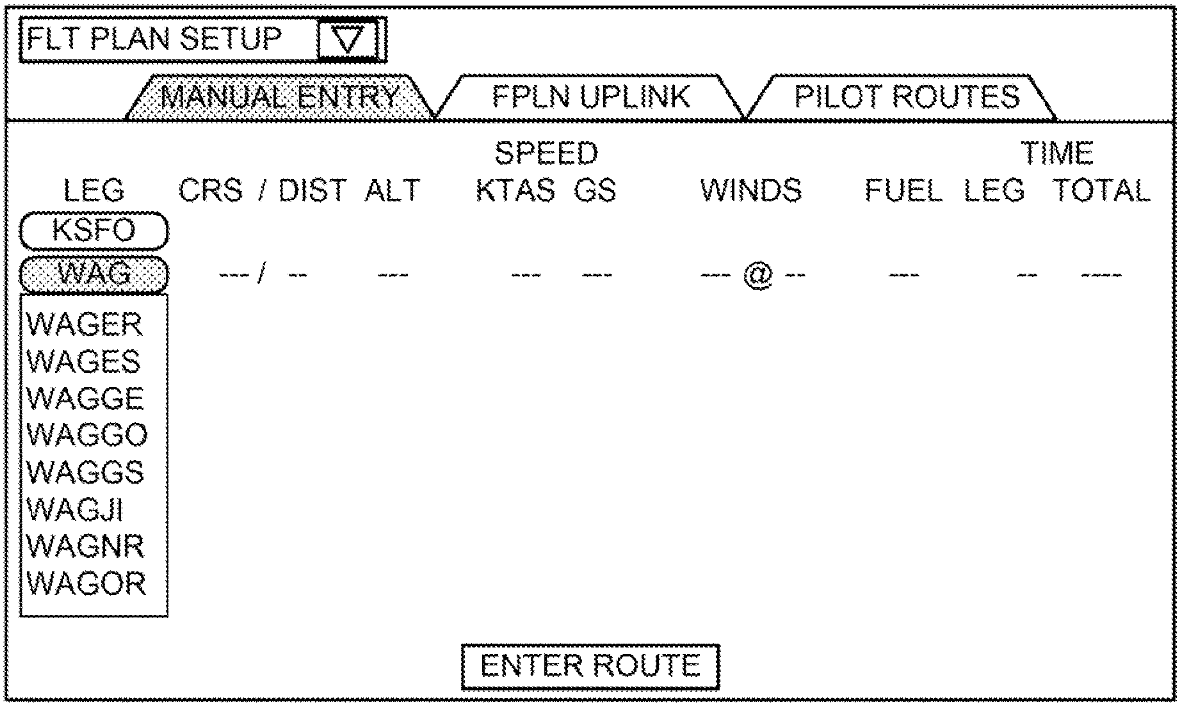

As shown in FIG. 3K, the pilot has tapped on the next text box to continue the waypoint entering process. In response to the pilot's tap, the user-enterable text box has been activated as highlighted in FIG. 3L. Because a user-enterable text box widget has been activated, the BIP 130 may be programmed to activate the voice mode and deactivate the tactile mode for the text box. Referring to FIG. 3M, the pilot has begun to enter the second waypoint by speaking the words WHISKEY ALPHA GOLF. Because the BIP 130 has been programmed with an auto-complete feature, a pop-up widget containing a plurality of auto-complete entries of waypoints beginning with the characters WAG appears as shown in FIG. 3N. Because the pop-up widget is a user-selectable widget, the BIP 130 could be programmed to activate the tactile mode for the widget when it appears and deactivate the mode when the pop-up widget disappears.

Figure 3O:
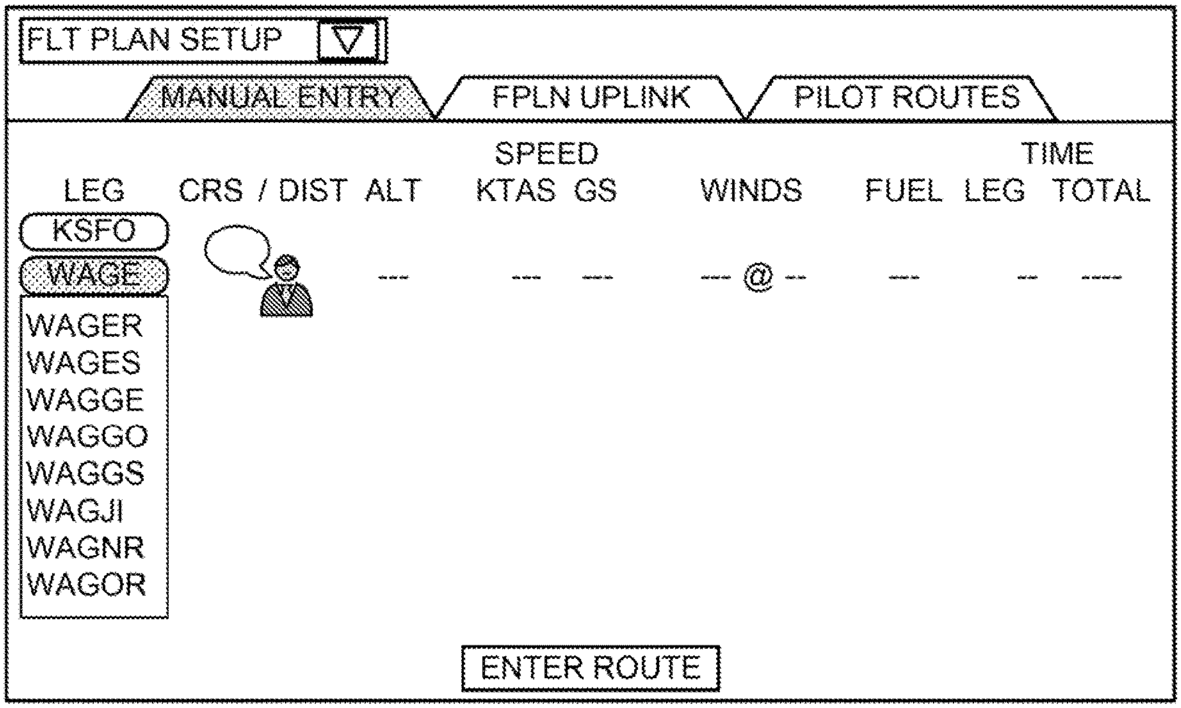
Figure 3P:
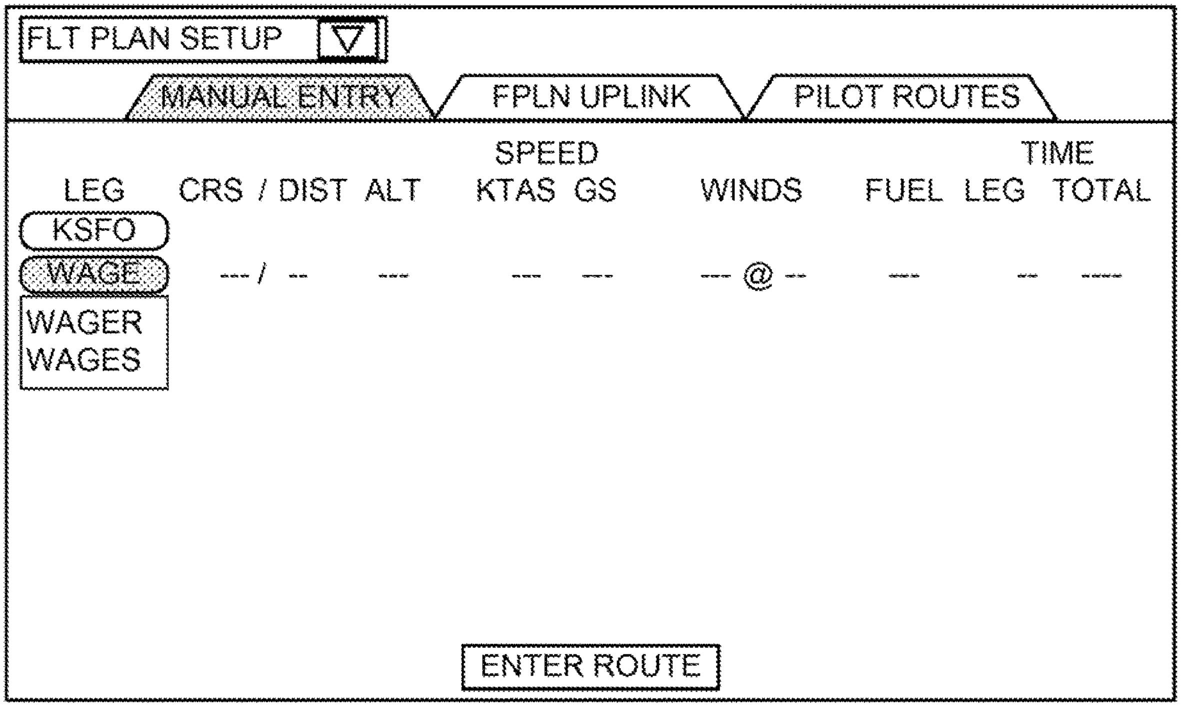
Figure 3Q:
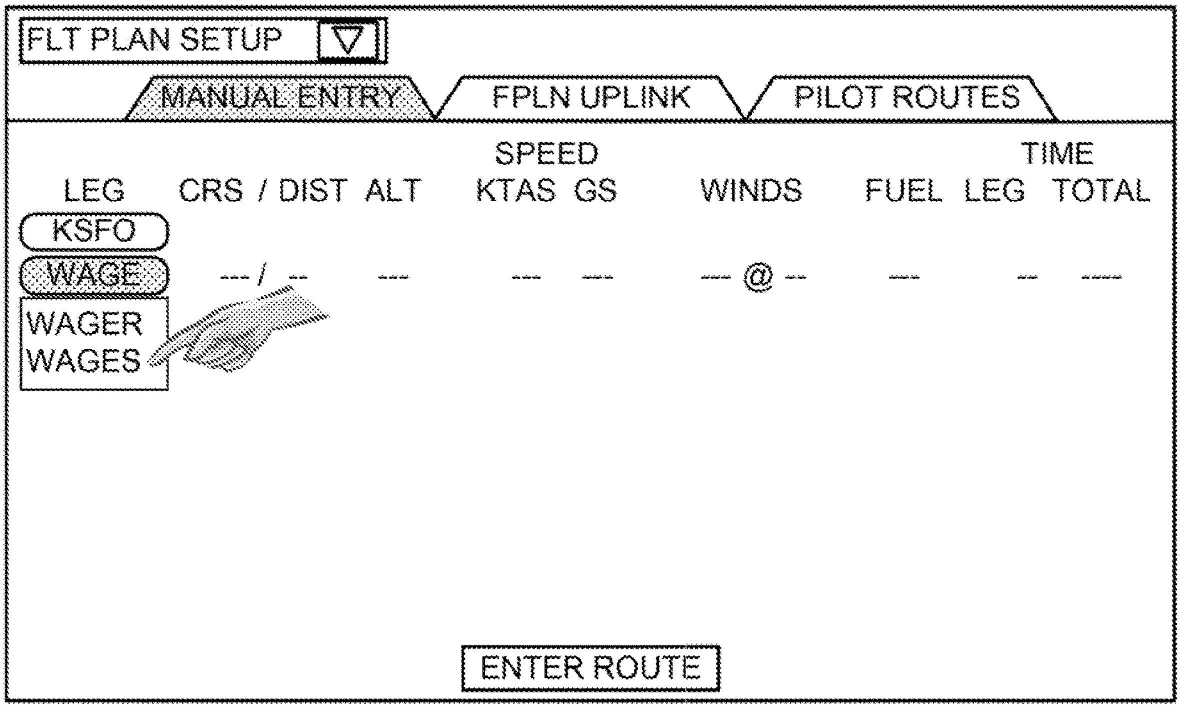
Figure 3R:
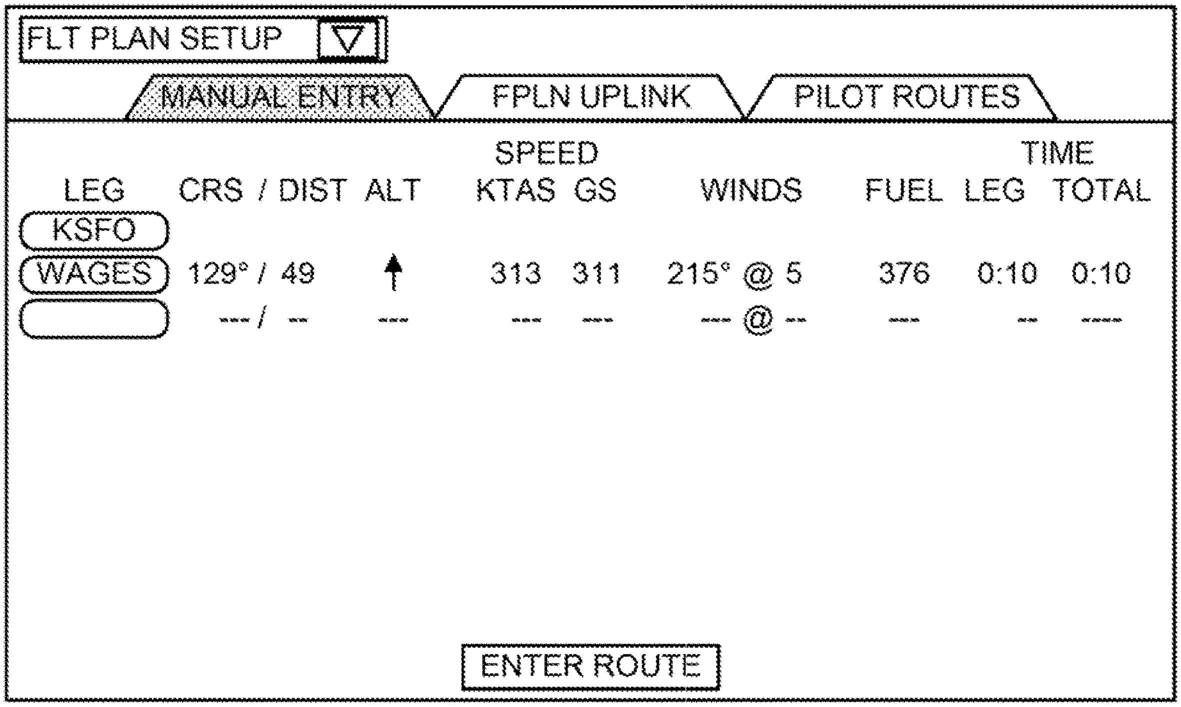

As shown in FIG. 3O, the pilot has elected to speak the fourth character ECHO and not tap the auto-complete entry WAGES. In response, the letter E appears in the text box as shown in FIG. 3P and the number of auto-complete entries has been reduced to corresponds to the first four letters WAGE. As shown in FIG. 3Q, the pilot has elected to tap the auto-entry word WAGES. As a result, the entry has been entered into the text box. As such, the BIP 130 could be programmed to deactivate the voice mode for the text box the entry has finished.

Figure 3S:
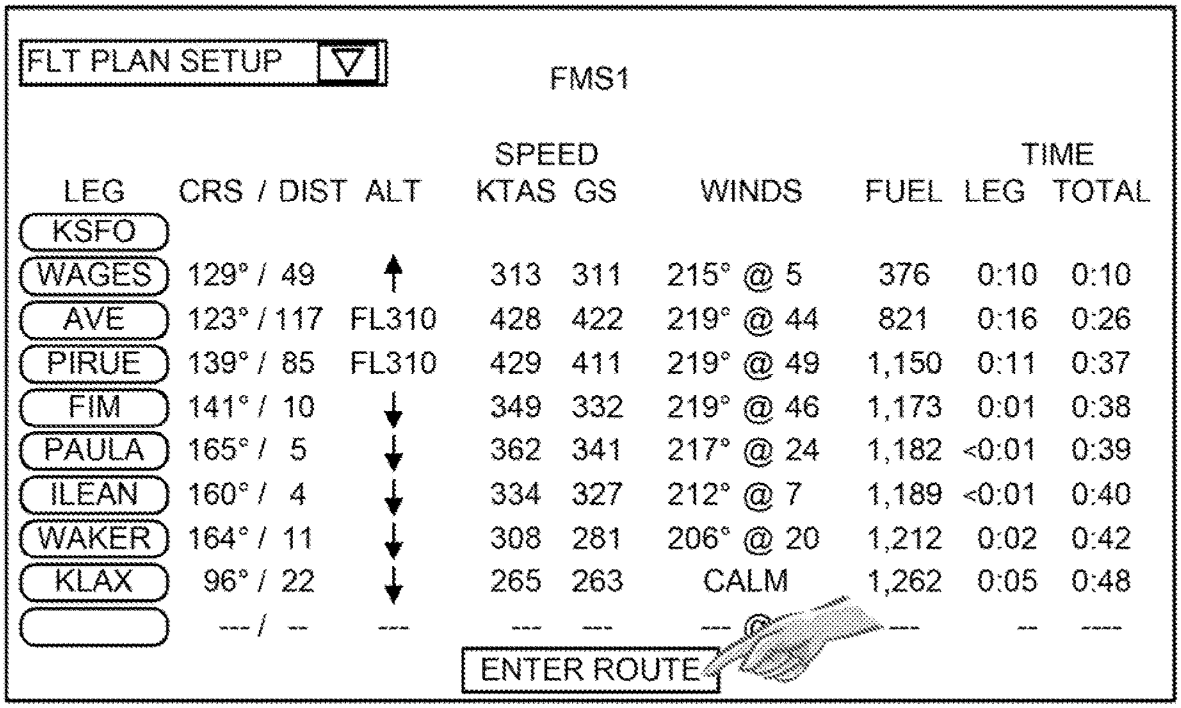

Referring to FIG. 3S, the pilot has completed entering the waypoints in the flight plan. In order to notify the FMS that the flight route has been entered in its entirety, the ENTER ROUTE user-selectable widget could be selected by tapping because the tactile mode was not disabled when while the pilot was entering the waypoints.

Although the discussion above was drawn to the entry of a textual flight plan using primarily alpha-numeric characters, the methods disclosed herein apply equally to the entry of data of any aircraft system for which a user interface has been created (e.g., tuning a radio, selecting a cockpit temperature, turning on/off mechanical pumps, opening/closing mechanical valves, etc. . . . ). Additionally, the methods disclosed herein apply equally to a graphical flight plan for which a visible graphical object could be considered a user-selectable widget that, when selected, may result with a pop-up widget being displayed that is not initially visible to the pilot.

Figure 4A:
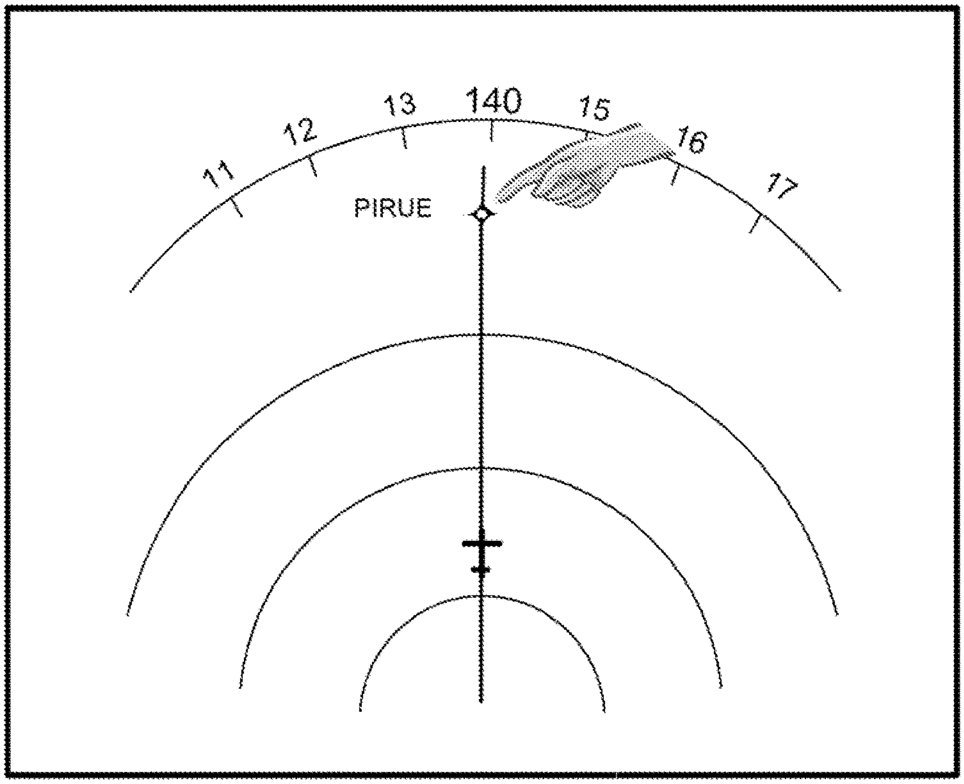
FIGS. 4A through 4C illustrate an example of the bimodal user interface method by illustrating the entry of waypoint data in a graphical flight plan.
Figure 4B:
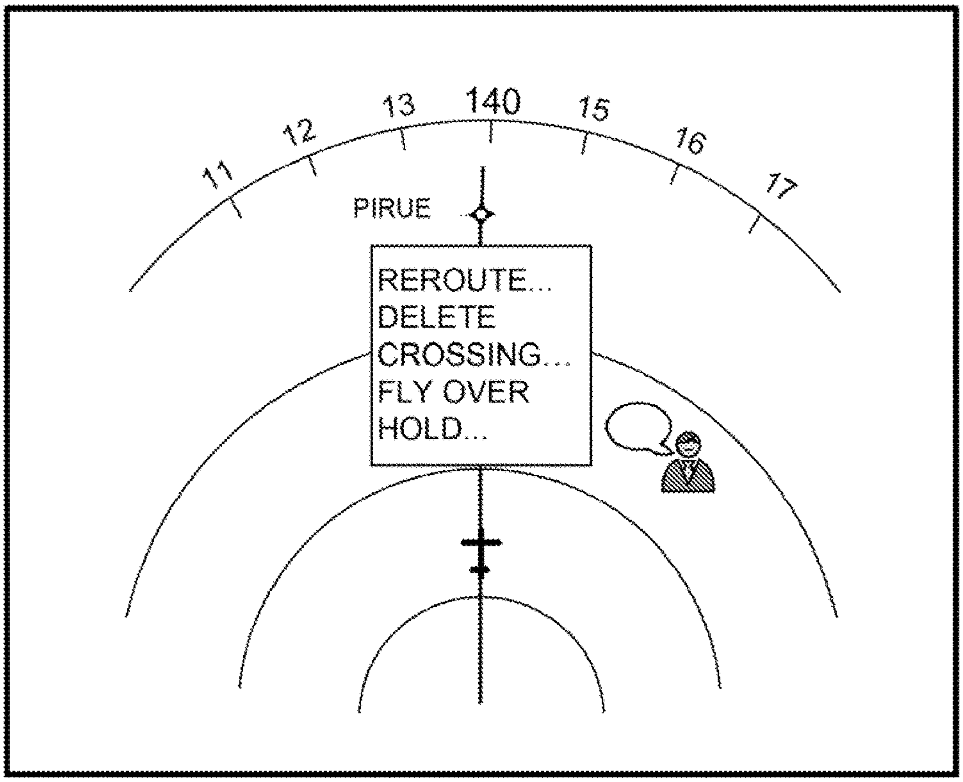
Figure 4C:
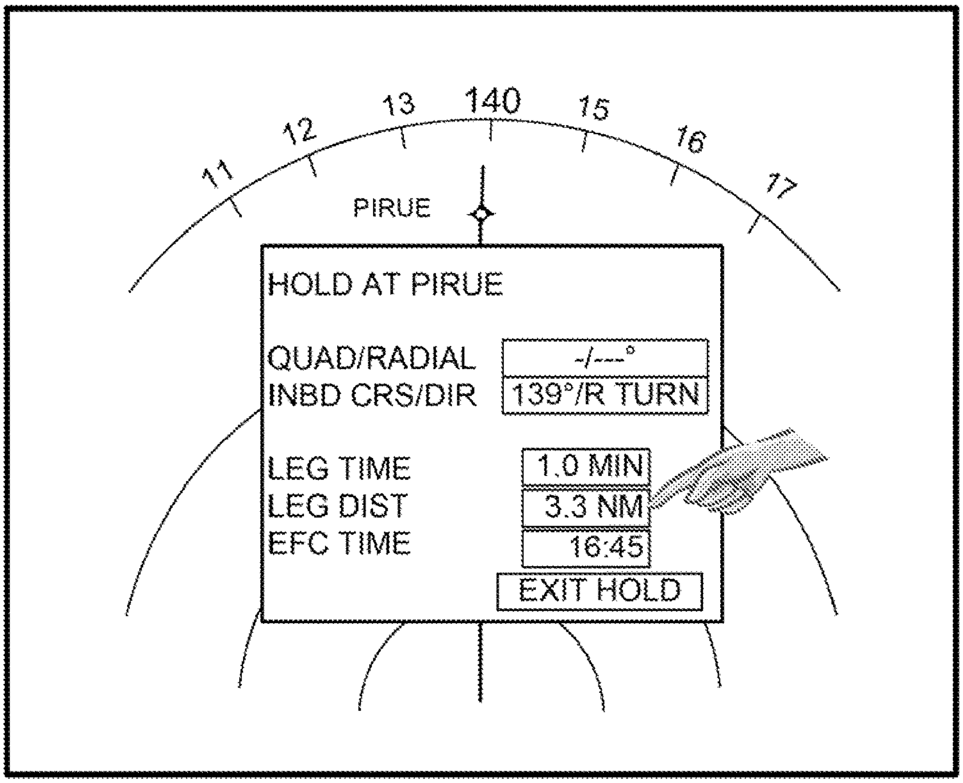

Referring to FIG. 4A, assume that the flight plan has been revised during flight and that a holding pattern has been assigned to the aircraft when it arrives at PIRUE. Because the object is the symbol of a waypoint and it is a user-selectable widget, the tactile mode is active and the voice mode is not. As such, the pilot may tap on the waypoint widget corresponding to PIRUE as shown in FIG. 4A. As shown in FIG. 4B, a pop-up widget has appeared. Because the pop-up widget indicates a limited number (here, five) of actual words (and not waypoint identifier which may or may not be actual words), the BIP 130 may activate the voice mode for the pop-up widget and retrieve a limited number of vocabulary files shown in the pop-up widget from the voice input device 114. Then, the pilot may speak the word HOLD as shown (or tap HOLD . . . ). As shown in FIG. 4C, another pop-up widget appears in which there is a plurality of text boxes. As discussed above, the pilot may activate one text box by tapping on it (here, the pilot wants to change the leg distance of the holding pattern). As stated above, he or she may tap on the text box to activate it as shown in FIG. 4C and enter each character through the voice mode only. Although not indicated in the drawings of FIG. 4, a separate user-selectable widget could be placed within the window and/or page from which the deactivation or inhibition of the tactile mode may be overridden, thereby allowing the use of a tactile device to make the entry. After the information has been entered into the text box, the voice mode for the text box may be deactivated.

It should be noted that the methods described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A bimodal user interface system employed to streamline a pilot's interface with a display unit by selectively restricting the availability and use of tactile and voice modes, comprising:

a display unit configured to present an image comprised of at least one enterable widget and at least one selectable widget and configured for bimodal entering of a flight plan by a pilot, where
- each enterable widget and each selectable widget are graphical user interfaces for facilitating a pilot's interaction,
- each enterable widget and each selectable widget include a tactile mode and a voice mode, and
- each enterable widget is either an inactive enterable widget or an active enterable widget, where
  - an inactive enterable widget is a widget with its tactile mode activated and voice mode deactivated, such that the inactive enterable widget is responsive to pilot input received via a tactile input device only, and
  - an active enterable widget is a widget with its tactile mode deactivated and voice mode activated, such that the active enterable widget is responsive to pilot input received via a voice input device only; and a bimodal interface processor including at least one processor coupled to a non-transitory processor-readable medium storing processor-executable code and configured to:
- generate image data representative of the image presented by the display unit;
- receive, via an inactive enterable widget included in the image, selection data representative of its selection by the pilot to begin the entering of at least first and final waypoints of the flight plan, whereupon
  - the selected inactive enterable widget changes to a first active enterable widget;
- receive, via the first active enterable widget only, first input data representative of the first waypoint of the flight plan being entered, whereupon
  - the entering of the first waypoint is presented to the pilot;
- receive second input data representative of a completion of the first waypoint being entered, whereupon
  - the first waypoint is entered into the flight plan and the voice mode of the first active enterable widget is deactivated, where
    - the second input data is received via the first active enterable widget in response to a predefined voice command separate from the first waypoint being entered, via an inactive enterable widget in response to a tactile selection and into which no waypoint has been entered, or via a selectable widget in response to a tactile selection only of an auto-completion entry in a pop-up widget;

receive, via a second active enterable widget only, third input data representative of the final waypoint of the flight plan being entered, whereupon the entering of the final waypoint is presented to the pilot;

receive fourth input data representative of a completion of the entering of the final waypoint, whereupon the final waypoint is entered into the flight plan and the voice mode of the second active enterable widget is deactivated, where the fourth input data is received via the second active enterable widget in response to a predefined voice command separate from the first waypoint being entered, via an inactive enterable widget in response to a tactile selection and into which no waypoint has been entered, or via a selectable widget in response to a tactile selection only of an auto-completion entry in a pop-up widget; and receive, via a selectable widget in response to a tactile selection only, fifth input data representative of a completion of the entering of the flight plan, whereby a user system of the flight plan is notified of the completion.

2. The system of claim 1, wherein the tactile input device is a screen of the display unit.

3. The system of claim 1, wherein the voice input device employs a voice recognition system.

4. The system of claim 1, wherein the bimodal interface processor is further configured to:

receive, via at least one third active enterable widget only and prior to the third input data being received, sixth input data representative of at least one waypoint in between the first and final waypoints being entered, whereupon the entering of each waypoint of the at least one waypoint is presented to the pilot; and receive seventh input data representative of a completion of each waypoint of the at least one waypoint being entered, whereupon each waypoint of the at least one waypoint is entered into the flight plan and the voice mode of the its active enterable widget is deactivated, where the seventh input data is received via the at least one third active enterable widget in response to a predefined voice command separate from its waypoint being entered, via an inactive enterable widget in response to a tactile selection and into which no waypoint has been entered, or via a selectable widget in response to a tactile selection only of an auto-completion entry in a pop-up widget.

5. The system of claim 1, wherein the display unit is further configured to present a second image comprised of at least one second selectable widget, a third selectable widget for each second selectable widget, and at least one third active enterable widget for the third selectable widget and configured for revising the flight plan, where each second selectable widget is responsive to pilot input received via the tactile input device only, and each third selectable widget is responsive to pilot input received via the tactile input device or the voice input device; and the bimodal interface processor is further configured to:

generate image data representative of the second image presented by the display unit;

receive, via a second selectable widget only, sixth input data representative of a symbol being selected, whereupon at least one predefined waypoint command is presented to the pilot in a third selectable widget;

receive, via the third selectable widget only, seventh input data representative of one predefined waypoint command for the selected symbol, whereupon flight plan revision information is presented to the pilot in a third active enterable widget;

receive, via the third active enterable widget only, eighth input data representative of flight plan revision information being entered, whereupon the entering of the flight plan revision information is presented to the pilot; and receive ninth input data representative of a completion of the entering of the flight plan revision information, whereby the user system of the flight plan is notified of the completion of the entering of the flight plan revision information.

6. A bimodal user interface device employed to streamline a pilot's interface with a display unit by selectively restricting the availability and use of tactile and voice modes, comprising:

a bimodal interface processor including at least one processor coupled to a non-transitory processor-readable medium storing processor-executable code and configured to:

generate image data representative of an image comprised of at least one enterable widget and at least one selectable widget presented by a display unit and configured for bimodal entering of a flight plan by a pilot, where each enterable widget and each selectable widget are graphical user interfaces for facilitating a pilot's interaction, each enterable widget and each selectable widget include a tactile mode and a voice mode, and each enterable widget is either an inactive enterable widget or an active enterable widget, where an inactive enterable widget is a widget with its tactile mode activated and voice mode deactivated, such that the inactive enterable widget is responsive to pilot input received via a tactile input device only, and an active enterable widget is a widget with its tactile mode deactivated and voice mode activated, such that the active enterable widget is responsive to pilot input received via a voice input device only;

receive, via an inactive enterable widget included in the image, selection data representative of its selection by the pilot to begin the entering of at least first and final waypoints of the flight plan, whereupon the selected inactive enterable widget changes to a first active enterable widget;

receive, via the first active enterable widget only, first input data representative of the first waypoint of a flight plan being entered, whereupon the entering of the first waypoint is presented to the pilot;

receive second input data representative of a completion of the first waypoint being entered, whereupon the first waypoint is entered into the flight plan and the voice mode of the first active enterable widget is deactivated, where
the second input data is received via the first active enterable widget in response to a predefined voice command separate from the first waypoint being entered, via an inactive enterable widget in response to a tactile selection and into which no waypoint has been entered, or via a selectable widget in response to a tactile selection only of an auto-completion entry in a pop-up widget;
receive, via a second active enterable widget only, third input data representative of the final waypoint of the flight plan being entered, whereupon
the entering of the final waypoint is presented to the pilot;
receive fourth input data representative of a completion of the entering of the final waypoint, whereupon
the final waypoint is entered into the flight plan and the voice mode of the second active enterable widget is deactivated, where
the fourth input data is received via the second active enterable widget in response to a predefined voice command separate from the first waypoint being entered, via an inactive enterable widget in response to a tactile selection and into which no waypoint has been entered, or via a selectable widget in response to a tactile selection only of an auto-completion entry in a pop-up widget; and
receive, via a selectable widget in response to a tactile selection only, fifth input data representative of a completion of the entering of the flight plan, whereby
a user system of the flight plan is notified of the completion.

7. The device of claim 6, wherein the tactile input device is a screen of the display unit.

8. The device of claim 6, wherein the voice input device employs a voice recognition system.

9. The device of claim 6, wherein
the bimodal interface processor is further configured to:
receive, via at least one third active enterable widget only and prior to the third input data being received, sixth input data representative of at least one waypoint in between the first and final waypoints being entered, whereupon
the entering of each waypoint of the at least one waypoint is presented to the pilot; and
receive seventh input data representative of a completion of each waypoint of the at least one waypoint being entered, whereupon
each waypoint of the at least one waypoint is entered into the flight plan and the voice mode of the its active enterable widget is deactivated, where
the seventh input data is received via the at least one third active enterable widget in response to a predefined voice command separate from its waypoint being entered, via an inactive enterable widget in response to a tactile selection and into which no waypoint has been entered, or via a selectable widget in response to a tactile selection only of an auto-completion entry in a pop-up widget.

10. The device of claim 6, wherein
the bimodal interface processor is further configured to:
generate image data representative of a second image comprised of at least one second selectable widget, a third selectable widget for each second selectable widget, and at least one third active enterable widget for the third selectable widget presented by the display unit and configured for revising the flight plan, where
each second selectable widget is responsive to pilot input received via the tactile input device only, and
each third selectable widget is responsive to pilot input received via the tactile input device or the voice input device;
receive, via a second selectable widget only, sixth input data representative of a symbol being selected, whereupon
at least one predefined waypoint command is presented to the pilot in a third selectable widget;
receive, via the third selectable widget only, seventh input data representative of one predefined waypoint command for the selected symbol, whereupon
flight plan revision information is presented to the pilot in a third active enterable widget;
receive, via the third active enterable widget only, eighth input data representative of flight plan revision information being entered, whereupon
the entering of the flight plan revision information is presented to the pilot; and
receive ninth input data representative of a completion of the entering of the flight plan revision information, whereby
the user system of the flight plan is notified of the completion of the entering of the flight plan revision information.

11. A bimodal user interface method employed to streamline a pilot's interface with a display unit by selectively restricting the availability and use of tactile and voice modes, comprising:
generating, by a bimodal interface processor including at least one processor coupled to a non-transitory processor-readable medium storing processor-executable code and via a first active enterable widget only, image data representative of an image comprised of at least one enterable widget and at least one selectable widget presented by a display unit and configured for bimodal entering of a flight plan by a pilot, where
each enterable widget and each selectable widget are graphical user interfaces for facilitating a pilot's interaction,
each enterable widget and each selectable widget include a tactile mode and a voice mode,
each enterable widget is either an inactive enterable widget or an active enterable widget, where
an inactive enterable widget is a widget with its tactile mode activated and voice mode deactivated, such that the inactive enterable widget is responsive to pilot input received via a tactile input device only, and
an active enterable widget is a widget with its tactile mode deactivated and voice mode activated, such that the active enterable widget is responsive to pilot input received via a voice input device only;
receiving, via an inactive enterable widget included in the image, selection data representative of its selection by the pilot to begin the entering of at least first and final waypoints of the flight plan, whereupon
the selected inactive enterable widget changes to a first active enterable widget;

receiving, via the first active enterable widget only, first input data representative of the first waypoint of the flight plan being entered, whereupon the entering of the first waypoint is presented to the pilot;

receiving second input data representative of a completion of the first waypoint being entered, whereupon the first waypoint is entered into the flight plan and the voice mode of the first active enterable widget is deactivated, where the second input data is received via the first active enterable widget in response to a predefined voice command separate from the first waypoint being entered, via an inactive enterable widget in response to a tactile selection and into which no waypoint has been entered, or via a selectable widget in response to a tactile selection only of an auto-completion entry in a pop-up widget;

receiving, via a second active enterable widget only, third input data representative of the final waypoint of the flight plan being entered, whereupon the entering of the final waypoint is presented to the pilot;

receiving fourth input data representative of a completion of the entering of the final waypoint, whereupon the final waypoint is entered into the flight plan and the voice mode of the second active enterable widget is deactivated, where the fourth input data is received via the second active enterable widget in response to a predefined voice command separate from the first waypoint being entered, via one inactive enterable widget in response to a tactile selection and into which no waypoint has been entered, or via a selectable widget in response to a tactile selection only of an auto-completion entry in a pop-up widget; and receiving, via a selectable widget in response to a tactile selection only, fifth input data representative of a completion of the entering of the flight plan, whereby a user system of the flight plan is notified of the completion.

12. The method of claim 11, wherein the tactile input device is a screen of the display unit.

13. The method of claim 11, wherein the voice input device employs a voice recognition system.

14. The method of claim 11, further comprising:

receiving, via at least one third active enterable widget only and prior to the third input data being received, sixth input data representative of at least one waypoint in between the first and final waypoints being entered, whereupon the entering of each waypoint of the at least one waypoint is presented to the viewer; and receiving seventh input data representative of a completion of each waypoint of the at least one waypoint being entered, whereupon each waypoint of the at least one waypoint is entered into the flight plan and the voice mode of the its active enterable widget is deactivated, where the seventh input data is received via the at least one third active enterable widget in response to a predefined voice command separate from its waypoint being entered, via an inactive enterable widget in response to a tactile selection and into which no waypoint has been entered, or via a selectable widget in response to a tactile selection only of an auto-completion entry in a pop-up widget.

15. The method of claim 11, further comprising:

generating image data representative of a second image comprised of at least one second selectable widget, a third selectable widget for each second selectable widget, and at least one third active enterable widget for the third selectable widget presented by the display unit and configured for revising the flight plan, where each second selectable widget is responsive to pilot input received via the tactile input device only, and each third selectable widget is responsive to pilot input received via the tactile input device or the voice input device; and receiving, via a second selectable widget only, sixth input data representative of a symbol being selected, whereupon at least one predefined waypoint command is presented to the pilot in a third selectable widget;

receiving, via the third selectable widget only, seventh input data representative of one predefined waypoint command for the selected symbol, whereupon flight plan revision information is presented to the pilot in a third active enterable widget;

receiving, via the third active enterable widget only, eighth input data representative of flight plan revision information being entered, whereupon the entering of the flight plan revision information is presented to the pilot; and receiving ninth input data representative of a completion of the entering of the flight plan revision information, whereby the user system of the flight plan is notified of the completion of the entering of the flight plan revision information.

* * * * *